United States Patent

[11] 3,604,212

| [72] | Inventor | Gunnar Erick Werner Lewin<br>Viggbyholm, Sweden |
|---|---|---|
| [21] | Appl. No. | 829,250 |
| [22] | Filed | June 2, 1969 |
|  |  | Division of Ser. No. 684,160, Nov. 20, 1967 |
| [45] | Patented | Sept. 14, 1971 |
| [73] | Assignee | AB Lyckeaborgs Bruk<br>Torskors, Sweden |

[54] CASTER WHEEL ARRANGEMENT WITH LOCKING DEVICE
2 Claims, 4 Drawing Figs.

[52] U.S. Cl. .................................................... 16/35
[51] Int. Cl. .............................................. B60b 33/00
[50] Field of Search ............................................. 16/35, 35 D; 188/1 D

[56] References Cited
UNITED STATES PATENTS

| Re.16,864 | 1/1928 | Perin ............................ | 16/35 |
| 1,632,435 | 6/1927 | Darnell ......................... | 16/35 |
| 2,654,112 | 10/1953 | Milhizer ....................... | 16/35 D |

Primary Examiner—Bobby R. Gay
Assistant Examiner—Doris L. Troutman
Attorney—Pierce, Scheffler & Parker ABSTRACT: A caster wheel arrangement is provided with means for simply and releasably locking the pivotal movement of the wheel fork in any one of a number of positions so as to cause the rolling movement to be in a desired direction.

PATENTED SEP 14 1971

CASTER WHEEL ARRANGEMENT WITH LOCKING DEVICE

The application is a divisional of my application, Ser. No. 684,160 filed Nov. 20, 1967.

According to the present invention a device is provided for locking in a certain direction a caster wheel arrangement which has no central rivet in the wheel fork but is provided with a large open central area for receiving said locking device.

The present invention is based on the desire to be able in a rapid and simple way to lock the caster wheels, for example on standard containers, in certain definite positions and, when desired, as rapidly and simply to release the locking. In many cases, standard containers mounted on caster wheels must be operated in limited spaces, such as narrow passages, and be pushed into small spaces between other containers located to the side of such passages. It has proved highly troublesome and time consuming to fit a container into a lateral space with a width only slightly greater than the container width. If it were possible to lock the caster wheel forks in a certain position perpendicular to the original drive direction, the steering of the container into the space could be facilitated substantially.

The invention comprises a direction locking device for a caster wheel arrangement, in which the cylindrical upper portion of the wheel fork is provided with a large open central space and is outwardly supported on a stationary mounting plate, and in which a locking member is mounted in the central space of the wheel fork and adapted independently of the wheel movements and with the help of a control means to lock the wheel fork in certain preselected directions.

The invention will be described with reference to the accompanying drawings.

Figure 1:
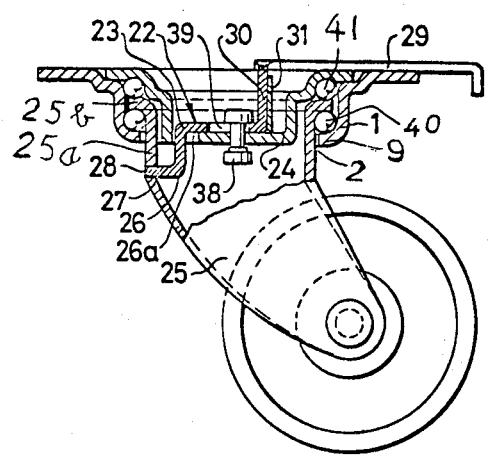
FIG. 1 shows an elevational view, partially in cross section, of a caster wheel arrangement with a direction locking device according to the present invention.

The caster wheel arrangement includes a mounting plate 1 which is mounted on an object or container. The mounting plate 1 has a relatively large central opening 2 into which the wheel fork 25 (FIG. 1) may be inserted from above. The upper portion 25a of the wheel fork 25 is cylindrical and has an outwardly extending flange 25b about its upper edge, which flange has a diameter greater than the diameter of the opening 2 so as to provide with the surrounding edge 9 of the opening 2, a race for ball bearings 40. A second race for ball bearings 41 above the flange 25b is provided, as shown, by the upper outer flange of a central plate 24.

Figure 2:
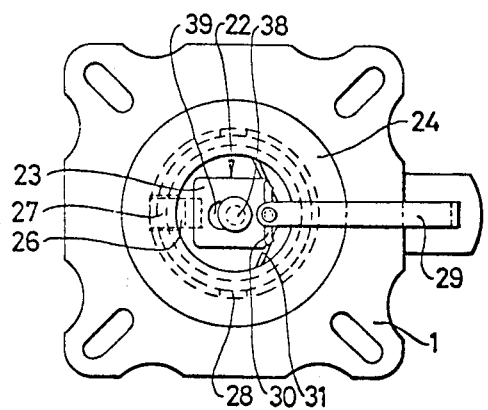
FIG. 2 shows a horizontal plan view of the arrangement according to FIG. 1.

As shown in FIGS. 1 and 2, the wheel fork 25 with the upper cylindrical portion 25a is supported by flange 25b of said portion on the stationary mounting plate 1. The cylindrical portion 25a has a large open central space inside thereof. The central plate 24 mounted stationary in the mounting plate 1 substantially covers the open central space of the wheel fork.

A crosspiece 23 of a locking bar 22 which in FIG. 1 is substantially Z-shaped is provided with a slot 39 and is displaceably fastened to the central plate 24 by a screw, rivet or the like 38. The Z-stem 26 of the locking bar 22 projects downwardly through a slot 26a in the central plate 24, and its lower crosspiece 27 extends radially to the inner wall of the wheel fork 25 and is adapted to be inserted into suitably shaped locking holes 28 in said wall, thereby rendering it possible to lock the wheel fork in a certain direction. The crosspiece 23 of the locking bar 22 has at its end an upwardly extending portion 30 which is connected with a control rod 29 displaceably mounted in the stationary mounting plate 1. The control rod 29 can be replaced by a wire or another control means. A spring 31 with initial stress is mounted on the central plate 24 so as to urge the upwardly extending portion 30 to press the crosspiece 27 into engagement with the locking holes 28. Thus, the wheel fork 25 normally is locked in one of several possible positions, and in order to turn the wheel fork, the control rod 29 must be pulled out some distance in relation to the mounting plate 1, whereby the locking bar 22 is displaced to the right in FIG. 1 or 2 to release crosspiece 27 from its engagement with the locking hole 28.

Figure 3:
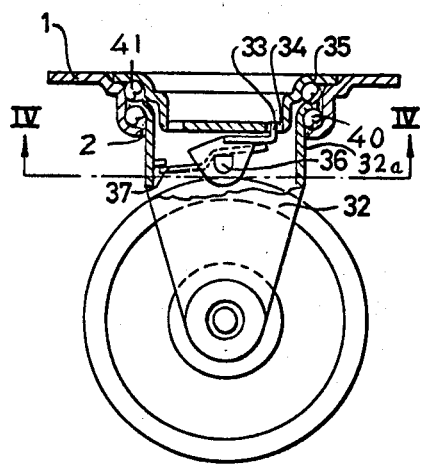
FIG. 3 shows an elevational view, partially in cross section, of another embodiment of the invention.
Figure 4:
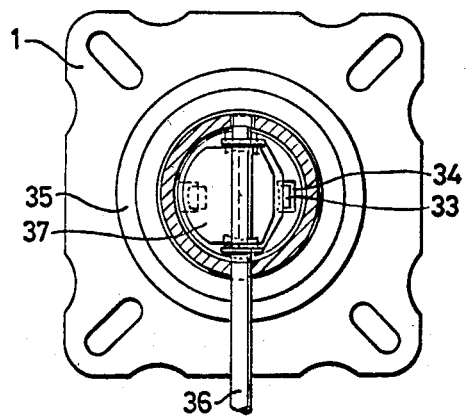
FIG. 4 shows a cross section along the line IV—IV in FIG. 3.

In FIGS. 3 and 4 a different embodiment of the arrangement according to the present invention is shown, wherein the wheel fork 32 is provided with a vertical configuration and has a shape slightly different from that in the aforedescribed embodiment, but where in other respects the mounting and the principle are the same. In a stationary mounting plate 1 there is outwardly supported the upper cylindrical portion 32a of the wheel fork 32, and a stationary central plate 35 is provided in the mounting plate 1 to project downwardly into the open central space of the wheel fork. The central plate 35 has a number (preferably four or eight) of locking holes 34 which may be engaged by a vertically hinged pawl 33 which is nonrotatably mounted on a rotatable control shaft 36 extending through the upper cylindrical portion 32a of the wheel fork 32. One end of said shaft projects some distance outwardly of the wheel fork and is provided with a handle or the like (not shown). The pawl 33 normally is held prestressed towards the locking position by a spring 37 with initial stress, whereby the wheel fork is locked in a certain direction. For turning the wheel fork, the control shaft is turned in one direction (to the right in FIG. 3), whereby the pawl is released from its engagement with the locking hole 34 in the central plate 35 so that the wheel fork may be turned about its vertical axis.

The embodiment according to FIGS. 1 and 2 are best adapted for use when a fixed control rod for locking and releasing the direction locking device is desired, because in this embodiment the control rod always extends in one direction from the container and does not revolve with the caster.

Whereas the present invention has been described with reference to the embodiments shown in the drawings it will be understood that those various modifications which come with the scope of the appended claims are also covered.

I claim

1. A locking device for a caster wheel arrangement comprising a nonrotatable mounting plate, a wheel fork rotatably mounted on said mounting plate, said wheel fork being provided with an upper cylindrical wall provided with spaced locking openings thereabout and forming a central hollow space therein, a nonrotatable locking element movably mounted in a horizontal direction within the hollow space for selective engagement with said locking openings, means for resiliently urging said locking element into one of the locking openings so as to prevent rotation of the wheel fork and separate control means for releasably disengaging said locking element from said locking openings so as to permit rotation of the wheel fork to a desired position.

2. A locking device as claimed in claim 1 wherein said resilient urging means comprises a spring for resiliently urging the locking element into engagement with the selected locking opening and wherein the separate control means is nonrotatably mounted on the mounting plate for disengaging said locking element.